(12) United States Patent
Riley et al.

(10) Patent No.: US 8,813,168 B2
(45) Date of Patent: *Aug. 19, 2014

(54) METHODS, SYSTEMS, AND COMPUTER READABLE MEDIA FOR PROVIDING NESTED POLICY CONFIGURATION IN A COMMUNICATIONS NETWORK

(75) Inventors: Yusun Kim Riley, Weston, MA (US); Sundaram Rajagopalan, Waltham, MA (US); Uri Baniel, Buffalo Grove, IL (US)

(73) Assignee: Tekelec, Inc., Morrisville, NC (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/157,052

(22) Filed: Jun. 9, 2011
(Under 37 CFR 1.47)

(65) Prior Publication Data
US 2012/0084425 A1    Apr. 5, 2012

Related U.S. Application Data

(63) Continuation-in-part of application No. 12/973,186, filed on Dec. 20, 2010, and a continuation-in-part of application No. 12/479,179, filed on Jun. 5, 2009.

(60) Provisional application No. 61/292,058, filed on Jan. 4, 2010, provisional application No. 61/405,631, filed on Oct. 21, 2010, provisional application No. 61/059,133, filed on Jun. 5, 2008, provisional application No. 61/483,607, filed on May 6, 2011.

(51) Int. Cl.
| | | |
|---|---|---|
| *G06F 17/00* | (2006.01) | |
| *H04L 29/06* | (2006.01) | |
| *G06F 7/00* | (2006.01) | |
| *H04L 12/24* | (2006.01) | |
| *H04L 12/14* | (2006.01) | |

(52) U.S. Cl.
CPC .......... *H04L 12/244* (2013.01); *H04L 41/0893* (2013.01); *H04L 12/1407* (2013.01)
USPC .............................................. 726/1; 707/694

(58) Field of Classification Search
CPC .............. H04L 12/244; H04L 41/0893; H04L 12/1407
USPC .................................................. 726/1; 707/694
See application file for complete search history.

(56) References Cited

U.S. PATENT DOCUMENTS

| | | |
|---|---|---|
| 6,141,686 A | 10/2000 | Jackowski et al. |
| 6,651,101 B1 | 11/2003 | Gai et al. |

(Continued)

FOREIGN PATENT DOCUMENTS

| | | |
|---|---|---|
| EP | 1 551 144 A1 | 7/2005 |
| EP | 1 988 680 A1 | 11/2008 |

(Continued)

OTHER PUBLICATIONS

Notice of Allowance and Fee(s) Due for U.S. Appl. No. 13/225,390 (Oct. 9, 2012).

(Continued)

*Primary Examiner* — Azizul Choudhury
(74) *Attorney, Agent, or Firm* — Jenkins, Wilson, Taylor & Hunt, P.A.

(57) ABSTRACT

Methods, systems, and computer readable media for providing nested policy configuration in a communications network are disclosed. The method is performed at a policy and charging rules function (PCRF) node. According to one method, first policy profile information associated with a first identifier is obtained from a policy profile database, where the first identifier is associated with a first subscriber and where the first policy profile information includes a second identifier. Second policy profile information associated with the second subscriber is obtained, using the second identifier obtained with the first policy profile information, from the policy profile database.

20 Claims, 5 Drawing Sheets

(56) References Cited

U.S. PATENT DOCUMENTS

| | | | |
|---|---|---|---|
| 6,661,780 B2 | 12/2003 | Li | |
| 6,880,005 B1 | 4/2005 | Bell et al. | |
| 7,209,962 B2 | 4/2007 | Boden | |
| 7,289,498 B2 | 10/2007 | Yu et al. | |
| 7,581,249 B2 | 8/2009 | Bussiere et al. | |
| 7,719,966 B2 | 5/2010 | Luft et al. | |
| 7,940,683 B2 | 5/2011 | Dolganow et al. | |
| 8,042,148 B2* | 10/2011 | Andreasen et al. | 726/1 |
| 8,131,831 B1* | 3/2012 | Hu | 709/223 |
| 8,146,133 B2 | 3/2012 | Moon et al. | |
| 8,159,941 B2 | 4/2012 | Dolganow et al. | |
| 8,250,646 B2 | 8/2012 | Zheng | |
| 8,429,268 B2 | 4/2013 | Riley et al. | |
| 8,433,794 B2 | 4/2013 | Baniel et al. | |
| 8,458,767 B2 | 6/2013 | Riley et al. | |
| 2002/0143914 A1 | 10/2002 | Cihula | |
| 2002/0188562 A1 | 12/2002 | Igarashi et al. | |
| 2003/0003928 A1 | 1/2003 | Marjelund et al. | |
| 2003/0208523 A1 | 11/2003 | Gopalan et al. | |
| 2004/0111519 A1 | 6/2004 | Fu et al. | |
| 2005/0088977 A1 | 4/2005 | Roch et al. | |
| 2005/0107091 A1 | 5/2005 | Vannithamby et al. | |
| 2005/0122945 A1* | 6/2005 | Hurtta | 370/338 |
| 2006/0013191 A1 | 1/2006 | Kavanagh | |
| 2006/0233101 A1 | 10/2006 | Luft et al. | |
| 2007/0004393 A1 | 1/2007 | Forsberg et al. | |
| 2007/0066286 A1 | 3/2007 | Hurtta | |
| 2007/0121812 A1 | 5/2007 | Strange et al. | |
| 2007/0159976 A1 | 7/2007 | Dekeyzer et al. | |
| 2007/0195788 A1 | 8/2007 | Vasamsetti et al. | |
| 2007/0220251 A1 | 9/2007 | Rosenberg et al. | |
| 2007/0226775 A1* | 9/2007 | Andreasen et al. | 726/1 |
| 2007/0242692 A1* | 10/2007 | Limb et al. | 370/465 |
| 2007/0286117 A1* | 12/2007 | Balasubramanian et al. | 370/328 |
| 2008/0046963 A1 | 2/2008 | Grayson et al. | |
| 2008/0076388 A1 | 3/2008 | Nochimowski et al. | |
| 2008/0120700 A1* | 5/2008 | Pandey et al. | 726/4 |
| 2008/0137541 A1 | 6/2008 | Agarwal et al. | |
| 2008/0201772 A1 | 8/2008 | Mondaeev et al. | |
| 2008/0232376 A1 | 9/2008 | Huang et al. | |
| 2008/0276305 A1 | 11/2008 | Chan et al. | |
| 2008/0313708 A1 | 12/2008 | Khan et al. | |
| 2009/0089418 A1 | 4/2009 | Saha et al. | |
| 2009/0109845 A1 | 4/2009 | Andreasen et al. | |
| 2009/0141625 A1* | 6/2009 | Ghai et al. | 370/230 |
| 2009/0177650 A1 | 7/2009 | Petersson et al. | |
| 2009/0196225 A1 | 8/2009 | Avila Gonzalez et al. | |
| 2009/0222538 A1 | 9/2009 | Takahashi et al. | |
| 2009/0227231 A1 | 9/2009 | Hu et al. | |
| 2009/0228956 A1 | 9/2009 | He et al. | |
| 2009/0285225 A1 | 11/2009 | Dahod | |
| 2009/0307028 A1 | 12/2009 | Eldon et al. | |
| 2009/0323536 A1 | 12/2009 | Liu et al. | |
| 2010/0040047 A1 | 2/2010 | Castellanos Zamora et al. | |
| 2010/0048161 A1 | 2/2010 | He et al. | |
| 2010/0121960 A1 | 5/2010 | Baniel et al. | |
| 2010/0185488 A1 | 7/2010 | Hogan et al. | |
| 2010/0235877 A1 | 9/2010 | Hu et al. | |
| 2011/0022702 A1 | 1/2011 | Riley et al. | |
| 2011/0022722 A1* | 1/2011 | Castellanos Zamora et al. | 709/235 |
| 2011/0041182 A1 | 2/2011 | Stenfelt | |
| 2011/0111767 A1 | 5/2011 | Livanos | |
| 2011/0158090 A1 | 6/2011 | Riley et al. | |
| 2011/0167471 A1 | 7/2011 | Riley et al. | |
| 2011/0170412 A1 | 7/2011 | Ramadas et al. | |
| 2011/0202653 A1 | 8/2011 | Riley et al. | |
| 2011/0219426 A1 | 9/2011 | Kim et al. | |
| 2011/0225280 A1 | 9/2011 | Delsesto et al. | |
| 2011/0225306 A1 | 9/2011 | Delsesto et al. | |
| 2011/0225309 A1 | 9/2011 | Riley et al. | |
| 2011/0296489 A1* | 12/2011 | Fernandez Alonso et al. | 726/1 |
| 2012/0131165 A1 | 5/2012 | Baniel et al. | |
| 2012/0144049 A1 | 6/2012 | Lopez Nieto et al. | |

FOREIGN PATENT DOCUMENTS

| | | |
|---|---|---|
| EP | 2 045 974 A1 | 4/2009 |
| EP | 2 093 931 A1 | 8/2009 |
| KR | 10-2006-0028042 | 3/2006 |
| KR | 10-2009-0027861 | 3/2009 |
| WO | WO 2007/092573 A2 | 8/2007 |
| WO | WO 2008/000287 A1 | 1/2008 |
| WO | WO 2008/114217 A1 | 9/2008 |
| WO | WO 2009/058067 A1 | 5/2009 |
| WO | WO 2009/149341 | 12/2009 |
| WO | WO 2010/086013 A1 | 8/2010 |
| WO | WO 2011/011790 A2 | 1/2011 |
| WO | WO 2011/082036 A2 | 7/2011 |
| WO | WO 2011/100684 A2 | 8/2011 |
| WO | WO 2011/109821 A2 | 9/2011 |
| WO | WO 2011/115991 A2 | 9/2011 |

OTHER PUBLICATIONS

Non-Final Official Action for U.S. Appl. No. 12/479,179 (Sep. 13, 2012).

European Search Report for European Patent Application No. EP 09 75 9499 (Sep. 12, 2012).

Non-Final Official Action for U.S. Appl. No. 12/973,186 (Aug. 24, 2012).

Applicant-Initiated Interview Summary for U.S. Appl. No. 13/225,390 (Aug. 13, 2012).

Non-Final Official Action for U.S. Appl. No. 13/042,294 (Jun. 20, 2012).

Notice of Allowance and Fee(s) Due for U.S. Appl. No. 12/621,190 (May 29, 2012).

Non-Final Official Action for U.S. Appl. No. 13/225,390 (May 14, 2012).

Communication of European publication number and information on the application of Article 67(3) EPC for European Application No. 10803020.6 (May 4, 2012).

Final Official Action for U.S. Appl. No. 12/479,179 (Apr. 10, 2012).

Applicant-Initiated Interview Summary for U.S. Appl. No. 12/621,190 (Feb. 7, 2012).

Notification of Transmittal of the International Search Report and the Written Opinion of the International Searching Authority, or the Declaration for International Application No. PCT/US2011/027427 (Nov. 15, 2011).

Notification of Transmittal of the International Search Report and the Written Opinion of the International Searching Authority, or the Declaration for International Application No. PCT/US2011/028520 (Oct. 31, 2011).

Notification of Transmittal of the International Search Report and the Written Opinion of the International Searching Authority, or the Declaration for International Application No. PCT/US2011/024753 (Oct. 28, 2011).

Notification of Transmittal of the International Search Report and the Written Opinion of the International Searching Authority, or the Declaration for International Patent Application No. PCT/US2010/061589 (Sep. 26, 2011).

Non-Final Official Action for U.S. Appl. No. 12/621,190 (Aug. 3, 2011).

Non-Final Official Action for U.S. Appl. No. 12/479,179 (Aug. 2, 2011).

Notification of Transmittal of the International Search Report and the Written Opinion of the International Searching Authority, or the Declaration for International Application No. PCT/US2010/043258 (Feb. 28, 2011).

"3rd Generation Partnership Project; Technical Specification Group Core Network and Terminals; Policy and Charging Control over Rx reference point (Release 9)," 3GPP TS 29.214, V9.3.0, pp. 1-45 (Mar. 2010).

"Universal Mobile Telecommunications System (UMTS); LTE; Policy and charging control over Rx reference point (3GPP TS 29.214 version 9.2.0 Release 9)," ETSI TS 129 214, V9.2.0 (Jan. 2010).

(56) References Cited

OTHER PUBLICATIONS

"Universal Mobile Telecommunications System (UMTS); LTE; Policy and charging control over Gx reference point (3GPP TS 29.212 version 9.1.0 Release 9)," ETSI TS 129 212, V9.1.0 (Jan. 2010).
3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).
3rd Generation Partnership Project, "Technical Specification Group Core Network and Terminals; Policy and Charging Control over Gx Reference Point," 3GPP TS 29.212, V8.0.0, Release 8 (May 2008).
Hakala et al., "Diameter Credit-Control Application," Network Working Group RFC 4006, pp. 1-114 (Aug. 2005).
Zhou et al., "Prophet Address Allocation for Large Scale MANETs," Ad Hoc Networks, vol. 1, Issue 4, pp. 423-434 (Nov. 2003).
Calhoun et al., "Diameter Base Protocol," RFC 3588, pp. 1-147 (Sep. 2003).
Ponnappan et al., "A Policy Based QoS Management System for the IntServ/DiffServ Based Internet," Policies for Distributed Systems and Networks, pp. 159-168 (2002).
Restriction Requirement for U.S. Appl. No. 12/479,179 (Feb. 8, 2011).
Notification of Transmittal of the International Search Report and the Written Opinion of the International Searching Authority, or the Declaration for International Application No. PCT/US2009/046395 (Dec. 28, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (Downloaded from the Internet on May 13, 2009) (May 28, 2008).
Agilent Technologies, "Understanding DSLAM and BRAS Access Devices," White Paper, pp. 1-15 (2006).
"GPRS Tutorial," MorganDoyle Limited, pp. 1-13 (Publication Date Unknown).
Notice of Allowance and Fee(s) Due for U.S. Appl. No, 12/973,186 (Sep. 19, 2013).
Advisory Action Before the Filing of an Appeal Brief for U.S. Appl. No. 13/048,597 (Sep. 13, 2013).
Final Office Action for U.S. Appl. No. 12/973,228 (Jun. 21, 2013).
Non-Final Office Action for U.S. Appl. No. 12/973,228 (Feb. 1, 2013).
Communication of European Publication Number and Information on the Application of Article 67(3) EPC for European Patent Application No. 10841576.1 (Oct. 10, 2012).
Notification of Transmittal of the International Search Report and the Written Opinion of the International Searching Authority, or the Declaration for International Patent Application No. PCT/US2010/061586 (Sep. 28, 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Amendment Under 37 C.F.R. § 1.116 for U.S. Appl. No. 12/973,186 (Aug. 22, 2013).
Communication Under Rule 71(3) EPC for European Patent Application No. 09759499.8 (Aug. 14, 2013).
Non-Final Office Action for U.S. Appl. No. 13/024,967 (Aug. 5, 2013).
Notice of Allowance and Fee(s) Due for U.S. Appl. No. 12/479,179 (Jul. 9, 2013).
Interview Summary for U.S. Appl. No. 12/479,179 (Jul. 1, 2013).
Final Office Action for U.S. Appl. No. 13/048,597 (Jun. 21, 2013).
Final Office Action for U.S. Appl. No. 12/973,186 (May 22, 2013).
First Office Action for Chinese Patent Application No. 200980130515.0 (Apr. 24, 2013).
Non-Final Office Action for U.S. Appl. No. 13/048,607 (Mar. 4, 2013).
Non-Final Office Action for U.S. Appl. No. 13/048,629 (Feb. 15, 2013).
Final Office Action for U.S. Appl. No. 12/479,179 (Feb. 15, 2013).
Non-Final Office Action for U.S. Appl. No. 13/048,597 (Feb. 1, 2013).
Notice of Allowance and Fee(s) Due for U.S. Appl. No. 13/042,294 (Jan. 30, 2013).
Communication of European Publication Number and Information on the Application of Article 67(3) EPC for European Patent Application No. 11756855.0 (Jan. 4, 2013).
"3rd Generation Partnership Project; Technical Specification Group Core Network and Terminals; Policy and Charging Control over Rx reference point (Release 11)," 3GPP TS 29.214 V11.7.0, pp. 1-53 (Dec. 2012).
Notice of Allowance and Fee(s) Due for U.S. Appl. No. 12/621,190 (Dec. 27, 2012).
Communication of European Publication Number and Information on the Application of Article 67(3) EPC for European Patent Application No. 11751508.0 (Dec. 12, 2012).
Communication of European publication Number and information on the application of Article 67(3) EPC for European Application No. 11742958.9 (Nov. 21, 2012).
Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Policy and charging control: Spending limit reporting over Sy reference point (3GPP TS 29.219 version.11.2.0 Release 11)," ETSI TS 129 219 V11.2.0, pp. 1-22 (Oct. 2012).
3GPP, "Policy and Charging Control Over Rx Reference Point," 3GPP ETSI TS 29.214 version 8.3.0 Release 8 (Feb. 2009).

\* cited by examiner

METHODS, SYSTEMS, AND COMPUTER READABLE MEDIA FOR PROVIDING NESTED POLICY CONFIGURATION IN A COMMUNICATIONS NETWORK

PRIORITY CLAIM

This application is continuation-in-part of U.S. patent application Ser. No. 12/973,186, filed Dec. 20, 2010, which claims the benefit of U.S. Provisional Patent Application Ser. No. 61/292,058 filed Jan. 4, 2010 and U.S. Provisional Patent Application Ser. No. 61/405,631 filed Oct. 21, 2010; the disclosures of which are incorporated herein by reference in their entireties.

This application is also a continuation-in-part of U.S. patent application Ser. No. 12/479,179, file Jun. 5, 2009, which claims the priority benefit of U.S. provisional patent application No. 61/059,133, filed Jun. 5, 2008, the disclosures of which are incorporated herein by reference in their entireties.

This application also claims the benefit of U.S. provisional patent application Ser. No. 61/483,607, filed May 6, 2011; the disclosure of which is incorporated herein by reference in its entirety.

TECHNICAL FIELD

The subject matter described herein relates to policy configuration. More specifically, the subject matter relates to methods, systems, and computer readable media for providing nested policy configuration in a communications network.

BACKGROUND

Traditionally, control of quality of service (QoS) within telecommunications networks has been achieved using a combination of best-effort data delivery, network resources reservation, or data packet marking on data communication paths. However, the design of emerging next generation network (NGN) architectures (e.g., IMS, 3G, GSM, 3GPP, and Long Term Evolution (LTE)) will render this approach no longer viable. One feature of network topology within the various NGNs is that the signaling required to negotiate a data transfer (e.g., application signaling) may not travel on the same logical path as the actual data transfer itself (e.g., data traffic). Therefore, a policy entity is needed to link the application signaling on the service plane to data traffic on the transport plane in order to allow applications to request QoS to be performed on the traffic plane.

One example of such a policy entity is a policy and charging rules function (PCRF). PCRF evolved out of the 3GPP (third generation partnership product) specification as a component for IP Multimedia Subsystem networks (IMS). Today, PCRF is not exclusively tied to IMS networks but is applicable across many network types.

A policy and charging rules function (PCRF), or policy engine, at its most basic level, is a server that deploys a set of operator-created business rules in a communications network. These rules can be used to define how broadband network resources should be allocated to subscribers and applications and under what conditions. The PCRF is a policy decision point that may be centrally located in the network and communicates with access edge devices (e.g., policy enforcement points), applications, and operational support systems/business support systems (OSS/BSS) platforms to manage subscriber and network information according to the established rules. Policy rules encompass the business and technological rules that govern which network services a subscriber can access, at what bandwidth level, when, and for how long. Generally speaking, the PCRF queries, coordinates, and adjusts all of the network resources needed to provide the required services to individual, authorized subscribers. As such, the PCRF operates solely in the control plane and does not operate in the data plane. More specifically, the PCRF identifies appropriate policy rules by querying a subscription profile repository (SPR) and enforces them by sending them to, for example, a policy and charging enforcement function (PCEF).

One drawback to current PCEF operation is that policy is only defined on an individual, per-subscriber basis. For example, when a PCRF requests subscription information from a subscription profile repository (SPR) in order to determine a policy to be applied, the query returns data for a single subscriber. Currently no mechanism exists for defining and/or querying subscription profile information for groups of subscribers. As a result, in situations where many subscribers may share the same or similar profile information and, therefore, the same or similar policy rules, a high amount of network resources are required to individually store, obtain, and implement policies for groups of subscribers.

Other problems with current policy implementations include the fact that policy records can be associated with individual subscriber identifiers. For example, a policy record may be associated with a subscriber's international mobile station identifier or IMSI. It may be desirable to have a chain of linked policy records that can be applied to a single subscriber.

Accordingly, in light of these difficulties, a need exists for improved methods, systems, and computer readable media for leveraging existing mechanisms to provide group policy configuration in communications networks.

SUMMARY

Methods, systems, and computer readable media for providing nested policy configuration in a communications network are disclosed. The method is performed at a policy and charging rules function (PCRF) node. According to one method, first policy profile information associated with a first identifier is obtained from a policy profile database, where the first identifier is associated with a first subscriber and where the first policy profile information includes a second identifier. Second policy profile information associated with the second subscriber is obtained, using the second identifier obtained with the first policy profile information, from the policy profile database.

A system for providing nested policy configuration in a communications network is also disclosed. The system includes a policy profile database for storing first policy profile information associated with a first identifier and second policy profile information associated with a second identifier. The first identifier is associated with a first subscriber. The first policy profile information includes a second identifier. A policy and charging rules function (PCRF) is configured to obtain the first policy profile information from the policy database using the first identifier and to obtain the second policy profile information from the policy database using the second identifier obtained with the first policy profile information.

The subject matter described herein for providing nested policy configuration in a communications network may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits.

TERMINOLOGY

As used herein, the term "node" refers to a computing platform having at least one processor and at least one network interface.

As used herein, the term "chargeable event" refers to activity utilizing telecommunications network resources and related services for: user-to-user communication (e.g. a single call, a data communication session or a short message), user-to-network communication (e.g. service profile administration), inter-network communication (e.g. transferring calls, signalling, or short messages), and/or mobility (e.g. roaming or inter-system handover) that the network operator may want to charge for. A chargeable event characterises the resource/service usage and indicates the identity of the involved end user(s).

As used herein, the term "charging" refers to a function within a telecommunications network and associated OCS/BD components whereby information related to a chargeable event is collected, formatted, transferred and evaluated in order to make it possible to determine usage for which the charged party may be billed (offline charging) or the subscribers account balance may be debited (online charging).

As used herein, the term "offline charging" refers to a charging mechanism where charging information does not affect, in real-time, the service rendered.

As used herein, the term "online charging" refers to a charging mechanism where charging information can affect, in real-time, the service rendered and therefore a direct interaction of the charging mechanism with session/service control is required.

As used herein, the term "subscriber" refers to an entity (associated with one or more users) that is engaged in a subscription with a service provider.

As used herein, the term "subscription" refers to a description of a commercial relationship between a subscriber and a service provider.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for providing nested policy configuration in a communications network. As mentioned above, conventionally, the SPR serves as a database for particular users and is queried by the PCRF for a profile of a specific user. However, it would be useful for an operator to provision system parameters via the SPR, including the ability to dynamically push (i.e., unsolicited) these policies to the PCRF at any time. The present subject matter leverages existing mechanisms to allow operators to use the SPR for system-wide provisioning and to dynamically push policies to the PCRF by creating nested policy records, where one policy record contains an identifier that references another policy record. In one example, the nested identifier identifies a dummy or fake user that is known by both the PCRF and the SPR. The policy information for the fake user can be associated with one or more real users at the PCRF. In on example, a group policy associated with the fake user identifier may be used to override individual policy settings by using the fake user information. In another example, the nested identifier may simply be pointer or other identifier to another policy record for the same subscriber.

It may be appreciated that the subject matter described herein may be applied to a wide variety of communications technologies (e.g., Internet, telecom, etc.) as these technologies increasingly converge in modern communications networks. By applying the subject matter described herein to a converged communications network, the user may apply the same policy to his home television account, mobile phone, dorm room, etc. Exemplary groups may associate one or more subscribers based on operator-configurable criteria (e.g., bronze, silver, and gold group). Similarly, subscribers may be grouped into families (e.g., family1, family2, etc.) based on their status as members of a predefined group. It is further appreciated that a user may belong to more than one group (e.g., subscriber1 may be a member of family1 and Gold group). By applying policy settings of fake users to multiple subscribers, group policy settings may be implemented by network operators, which is not possible using conventional QoS control methods.

According to another aspect of the subject matter described herein, it may be appreciated that the PCRF may use a regular subscriber ID to query an SPR initially and then determine whether the subscriber belongs to a group when responding to a DIAMETER credit control request (CCR) message with a DIAMETER credit control application (CCA) message. The PCRF may then override the individual policy settings with group information associated with a fake user identifier or other nested identifier included in the first policy record retrieved for the subscriber. Additional details of the subject matter described herein will now be described below with the aid of the following figures.

Figure 1:
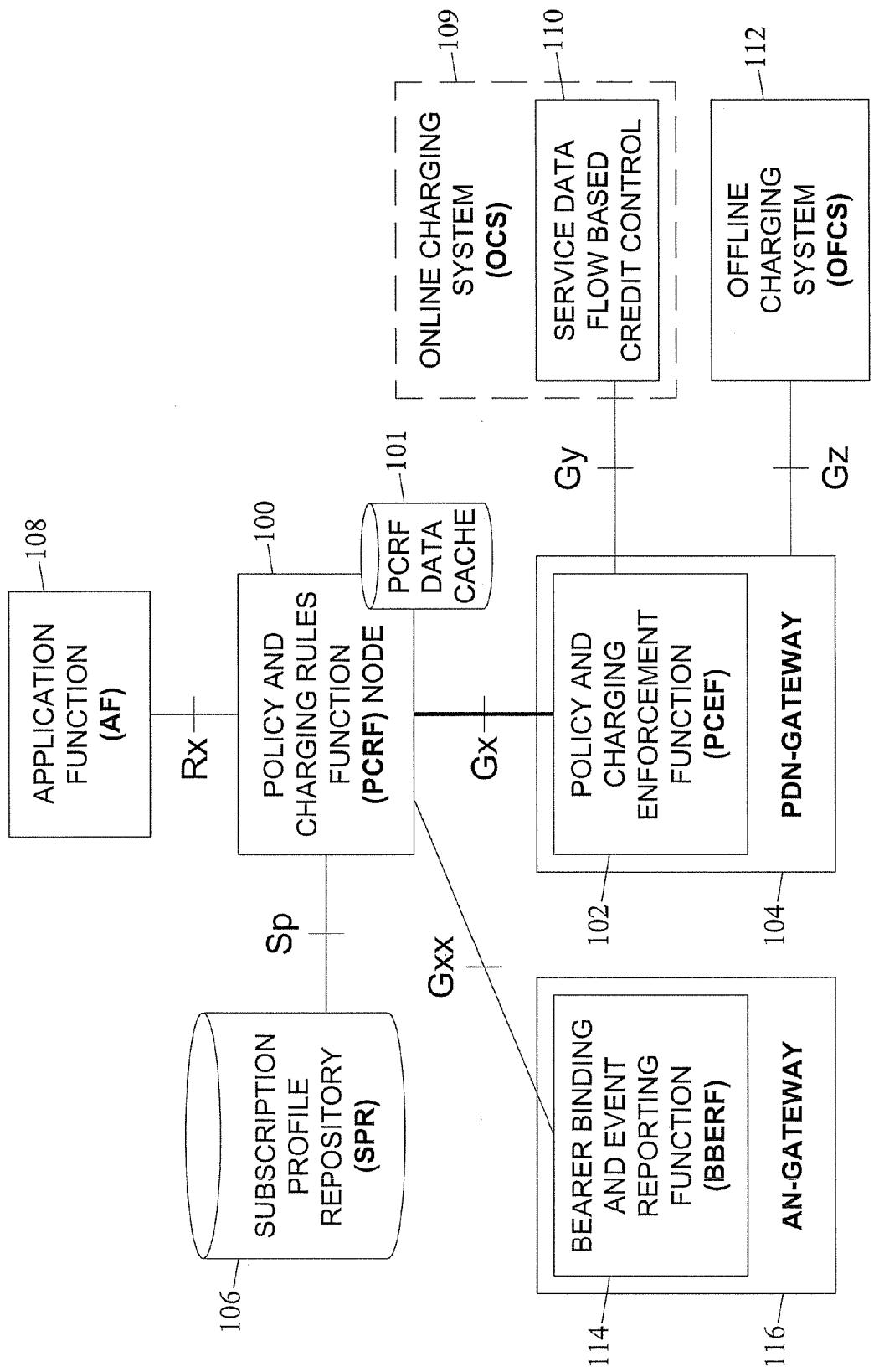
FIG. 1 is a network diagram showing an exemplary policy and charging control (PCC) architecture over Gx reference point suitable for providing nested policy configuration in a communications network according to an embodiment of the subject matter described herein.

FIG. 1 is a network diagram showing an exemplary policy and charging control (PCC) architecture over Gx reference point suitable for providing nested policy configuration in a communications network according to an embodiment of the subject matter described herein. Referring to FIG. 1, policy control and charging rules function (PCRF). 100 includes a functional element that encompasses policy control decision and flow based charging control functionalities. PCRF 100 provides network control regarding the service data flow detection, gating, QoS and flow based charging towards the policy and charging enforcement function (PCEF) 102. PCRF 100 receives session and media related information from the application function and informs the application function of traffic plane events. PCRF 100 may provision PCC rules to PCEF 102 via the Gx reference point. PCC rule decisions may be based on one or more of the following: information obtained from AF via the Rx reference point (e.g.

the session, media and subscriber related information), information obtained from PCEF 102 via the Gx reference point (e.g. Internet Protocol Connectivity Access Network (IP-CAN) bearer attributes, request type and subscriber related information), information obtained from SPR 106 via the Sp reference point (e.g. subscriber and service related data), and own PCRF pre-configured information. If the information from PCEF 102 contains traffic mapping information not matching any service data flow filter known to PCRF 100, and PCRF 100 allows the UE to request enhanced QoS for services not known to PCRF 100, PCRF 100 adds this traffic mapping information as service data flow filters to the corresponding authorized PCC rule. PCRF 100 may wildcard missing filter parameters, e.g., missing uplink TFT address and port information in case of GPRS. PCRF 100 reports events to the AF via the Rx reference point. PCRF 100 informs PCEF 102 through the use of PCC rules on the treatment of each service data flow that is under PCC control, in accordance with PCRF 100 policy decision(s). For general packet radio service (GPRS), it is possible to support policy control (i.e. access control and QoS control), on a per-PDP context basis for the user equipment (UE) initiated case. PCRF 100 may be able to select the bearer control mode that will apply for the IP-CAN session and provide it to PCEF 102 via the Gx reference point. Upon subscription to loss of AF signaling bearer notifications by the AF, PCRF 100 may request to PCEF 102 to be notified of the loss of resources associated to the PCC rules corresponding with AF signaling IP flows, if this has not been requested previously.

PCRF data cache 101 may include PCC rules and policy profile information incorporating information associated with, nested identifiers, including identifiers for fake users that are nested within other policy records. By using nested user identifiers, PCRF data 101 may include group-based policies that may be applied to multiple subscribers. For example, PCRF 100 may download profiles for both subscriber ID X and group ID Z from a policy profile database, such as SPR 106, where group policies for nested user identifiers, including nested identifiers for fake users, are provisioned. Based on the service group ID specified in the subscriber X profile, PCRF 100 may modify the policy for subscriber ID X provided by SPR 106 to include one or more policy elements associated with the policy for Group ID Z. PCRF data 101 may then store the resulting modified subscriber profile that combines, or overrides, the guaranteed bitrate policy element specified in the fake group subscriber (group ID Z profile) with the real subscriber (subscriber ID X profile.)

The first policy profile information may be obtained by PCRF 100 from any suitable policy profile database, such as an SPR, an HSS, an AAA server, etc. According to one possible embodiment, the second subscriber identifier may be a fake user identifier known by the policy profile database that is associated with the second policy profile information. Hence, the second policy profile information is not associated with a second "real" subscriber, but rather, with a dummy or "fake" subscriber that does not exist. PCRF 100 may identify appropriate policy rules by querying the subscription policy profile database and enforce them by sending them to a policy and charging enforcement function (PCEF) node or/and Bearer Binding and Event Reporting Function (BBERF) or/and Traffic Detection Function (TDF) or/and Evolved Packet Data Gateway (ePDG). Moreover, according to another embodiment, the policy profile database may be configured to push the second policy profile information to plural PCRF nodes and the plural PCRF nodes may be configured to override individual policies with the group policy.

PCEF 102 is a functional element that encompasses policy enforcement and flow based charging functionalities. This functional entity is located at the Gateway (e.g. GGSN in the GPRS case, and PDG in the WLAN case). PCEF 102 provides control over the user plane traffic handling at the gateway and its QoS, and provides service data flow detection and counting as well as online and offline charging interactions. For a service data flow that is under policy control, PCEF 102 may allow the service data flow to pass through the gateway if the corresponding gate is open. For a service data flow that is under charging control, PCEF 102 may allow the service data flow to pass through the Gateway if there is a corresponding active PCC rule and, for online charging, the OCS has authorized the applicable credit with that charging key. PCEF 102 may let a service data flow pass through the gateway during the course of the credit re-authorization procedure. If requested by PCRF 100, PCEF 102 may report to PCRF 100 when the status of the related service data flow changes, which can be used to monitor an IP-CAN bearer dedicated for AF signaling traffic.

Packet data network (PDN) gateway 104 provides connectivity from user equipment (UE) (not shown) to external packet data networks (not shown) by being the point of exit and entry of traffic for the UE. A UE may have simultaneous connectivity with more than one PDN gateway for accessing multiple PDNs. PDN gateway 104 may perform policy enforcement, packet filtering for each user, charging support, lawful interception, and packet screening. PDN gateway 104 may also act as the anchor for mobility between 3GPP and non-3GPP technologies such as WiMAX and 3GPP2 (CDMA 1X and EvDO).

Subscription profile repository (SPR) 106 is a logical entity within the 3GPP PCC architecture that contains information related to subscribers and subscriptions (PCC rules). This information is used by PCRF 100 to facilitate decision making procedures and can include information on the subscriber's permitted services, service pre-emption priorities, allowed QoS and charging related data. One example of SPR 106 may include an IMS Home Subscriber Server (HSS). A PCC rule may consist of a: rule name, service identifier, service data flow filter(s), precedence, gate status, QoS parameters, charging key (i.e. rating group), other charging parameters, and monitoring key. The rule name may be used to reference a PCC rule in the communication between the PCEF and the PCRF. The service identifier may be used to identify the service or the service component the service data flow relates to. The service flow filter(s) may be used to select the traffic for which the rule applies. It may be possible to define wildcarded service data flow filter(s), both for the dynamic and predefined PCC rules. The gate status indicates whether the service data flow, detected by the service data flow filter(s), may pass (gate is open) or shall be discarded (gate is closed) in uplink and/or in downlink direction. The QoS information includes the QoS class identifier (authorized QoS class for the service data flow), the Allocation and Retention Priority (ARP) and authorized bitrates for uplink and downlink. The charging parameters define whether online and offline charging interfaces are used, what is to be metered in offline charging, on what level the PCEF shall report the usage related to the rule, etc. For different PCC rules with overlapping service data flow filter, the precedence of the rule determines which of these rules is applicable. When a dynamic PCC rule and a predefined PCC rule have the same precedence, the dynamic PCC rule may take precedence. PCC rules may also include AF record information for enabling charging correlation between the application and bearer layer if the AF has provided this information via the Rx interface. The monitoring key for a PCC rule identifies a monitoring control instance that may be used for usage monitoring control of the service data flows controlled by the predefined PCC rule or dynamic PCC rule.

Application function (AF) 108 is configured to dynamically transfer service information to PCRF 100 to allow PCRF 100 to make decisions based on policy. In addition, AF 108 may also receive IP-CAN specific information and notification regarding IP-CAN bearer level events. A particular example of AF 108 may include a proxy-call session control function (P-CSCF).

Online charging system (OCS) 109 determines in real-time or near real-time whether the subscriber is authorized to perform a given action based on their prepaid credit status. Depending on whether, for example, immediate event charging (IEC) or event charging with unit reservation (ECUR) is used, OCS 109 may immediately authorize or disallow the completion of a chargeable event or may reserve a number of prepaid credits and either reauthorize additional credits or terminate a subscriber's session once the reserved credits have been used. This determination may be made in conjunction with prepaid application which contains prepaid credit status information associated with subscribers. For example, OCS 109 may query a prepaid application to determine whether a subscriber possesses enough credit to complete a desired transaction, such as a placing VoIP call or delivering a text message. Additionally, OCS 109 may copy accounting messages associated with a charging event and provide the copied messages to a downstream application for additional processing.

Service data flow based credit control 110 may perform online credit control functions together with OCS 109.

Offline Charging system (OFCS) 112 may generate charging events based on the observation of network resource usage. In networks and service elements that provide charging information, OFCS 112 may be the focal point for collecting and processing the information pertaining to chargeable events. Bearer binding and event reporting function (BBERF) 114 may include a functional element within AN-gateway 116. BBERF 114 may provide control over user plane traffic handling and encompasses the following functionalities: bearer binding, uplink bearer binding verification, and event reporting. For a service data flow that is under QoS control, BBERF 114 may ensure that the service data flow is carried over the bearer with the appropriate QoS class. BBERF 114 may report events to PCRF 100 based on the event triggers installed by the PCRF 100.

Access network (AN) gateway 116 refers to the serving gateway (S-GW) when Gxc applies and to a trusted non-3GPP access gateway when Gxa applies.

Figure 2:
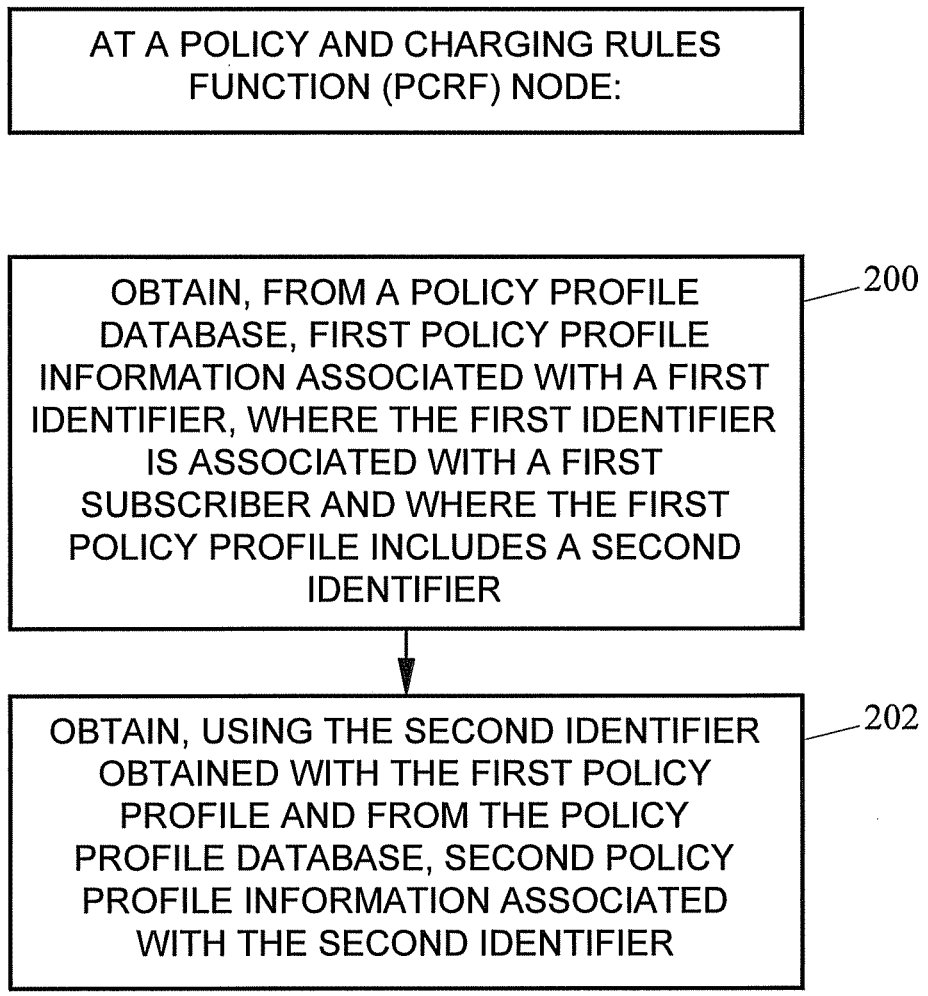
FIG. 2 is flow chart illustrating exemplary steps for providing nested policy configuration in a communications network according to an embodiment of the subject matter described herein.

FIG. 2 is flow chart illustrating exemplary steps for providing nested policy configuration in a communications network according to an embodiment of the subject matter described herein. Referring to FIG. 2, at step 200, first policy profile information associated with a first identifier is obtained from a policy profile database, where the first subscriber identifier is associated with a first subscriber. For example, referring to Table 1 shown below, subscriber ID X may be associated with a service level grouping identified by group ID 1. This service level grouping may be associated with a particular maximum download bitrate X but no guaranteed download bitrate (as indicated by a dash).

TABLE 1

Exemplary Subscriber Profile Repository (SPR) Data

| Subscriber ID | Service Level Group ID | Max Download Bitrate | Guaranteed Download Bitrate |
|---|---|---|---|
| SubID X | 1 | Bitrate X | — |
| GroupID Z | 1 | — | Bitrate Z |

The first policy profile information may be obtained by PCRF 100 from any suitable policy profile database, such as an SPR, an HSS, an AAA server, etc. In one example, policy information may be obtained from SPR 106 in response to a DIAMETER credit control request (CCR) message being sent by PCEF 102 as part of an IP CAN establishment procedure requesting policy and charging control (PCC) rules. In another example, policy information may be obtained from SPR 106 at bootup. It may be appreciated, however, that the above scenarios are exemplary and that the subject matter describe herein is not intended to be limited to obtaining policy profile information at any specific time.

The first policy profile information may be obtained by PCRF 100 using either a PULL or a PUSH procedure. A PULL procedure may occur when provisioning is solicited by PCEF 102. For example, in response to a request for PCC rules being made by PCEF 102, PCRF 100 may provision PCC rules using a CC-Answer message. A PUSH procedure may occur when provisioning is unsolicited. For example, PCRF 100 may decide to provision PCC rules without obtaining a request from PCEF 102, e.g., in response to information provided to the PCRF via the Rx reference point, or in response to an internal trigger within PCRF 100. In order to provision PCC rules without a request from PCEF 102, PCRF 100 may include the PCC rules in an RA-Request message. It may be appreciated that group ID Z may be formatted the same as a real subscriber identifier (e.g., IMSI).

At step 202, second policy profile information associated with the second subscriber identifier is obtained from the policy profile database using the second identifier obtained with the first policy profile information. For example, group ID Z may also be associated with service level group ID 1. Group ID Z may be associated with a guaranteed download bitrate Z, but no maximum download bitrate. In example above, the PCRF may determine the association between group ID Z and subscriber ID X using the data from the group ID field in Table 1 received from the SPR in the first record received from the SPR for subscriber X and may use the service level group ID 1 to subsequently obtain the subscriber record for fake user Group ID Z. Alternatively, the Group ID Z may be nested in the record for subscriber X and the Group ID Z may be used by the PCRF to subsequently obtain the policy for user group Z. In yet another alternative implementation, the SPR database may not include the group ID field illustrated above in Table 1. In such a case, the PCRF and/or the SPR may maintain a group ID database that, in this example, contains group ID Z and all individual subscriber identifiers associated with Group ID Z. The PCFR and/or the SPR may use the group ID database to recognize a subscriber identifier as being associated with group, to identify individual subscriber identifiers that are members of the group, and to apply the group policy to the individual subscribers. Table 2 shown below illustrates an example of a group ID database that may be maintained by the SPR and/or the PCRF.

TABLE 2

Exemplary Group Policy ID Database

| Group ID | Individual Subscriber Group Member IDs | Max Download Bitrate | Guaranteed Download Bitrate |
|---|---|---|---|
| Group ID Z | SubID X<br>Sub ID X1<br>SubID X2 | — | Bitrate Z |
| Group ID Z1 | SubID X3<br>SubIDX4<br>SubIDX5 | — | Bitrate Z1 |

In Table 2, two group identifiers Z and Z1 are illustrated, each with associate members. Using data such as this, the PCRF can determine not only that a subscriber identifier for which a policy is requested is a group policy, but also the individual subscriber identifiers in the group to which the policy should be applied. The PCRF may obtain this data from the SPR or may be provisioned by the network operator with this data.

After obtaining the second policy profile information, PCRF 100 may apply the second policy information to the first subscriber. For example, PCRF 100 may download both profiles for subscriber ID X and group ID Z from SPR 106. Based on the service group ID 1 specified in the subscriber X profile, PCRF 100 may modify the policy for subscriber ID X provided by SPR 106 to include one or more policy elements associated with the policy for Group ID Z provided by SPR 106. Continuing the example above, PCRF 100 may apply the guaranteed bitrate policy element specified in the fake group subscriber (group ID Z profile) to the real subscriber (subscriber ID X profile.) Table 3 illustrates the policy profile for subscriber X resulting from the association created by PCRF 100 and stored in PCRF data cache 101. As set forth above, even though Table 3 includes the service level group identifier, this field may be omitted without departing from the scope of the subject matter described herein.

TABLE 3

Exemplary policy profile for subscriber X that may be created and/or stored at the PCRF.

| Subscriber ID | Service Level Group ID | Max Download Bitrate | Guaranteed Download Bitrate |
|---|---|---|---|
| SubID X | 1 | Bitrate X | Bitrate Z |

PCRF 100 may respond by returning a DIAMETER credit control application (CCA) message to PCEF 102.

Figure 3A:
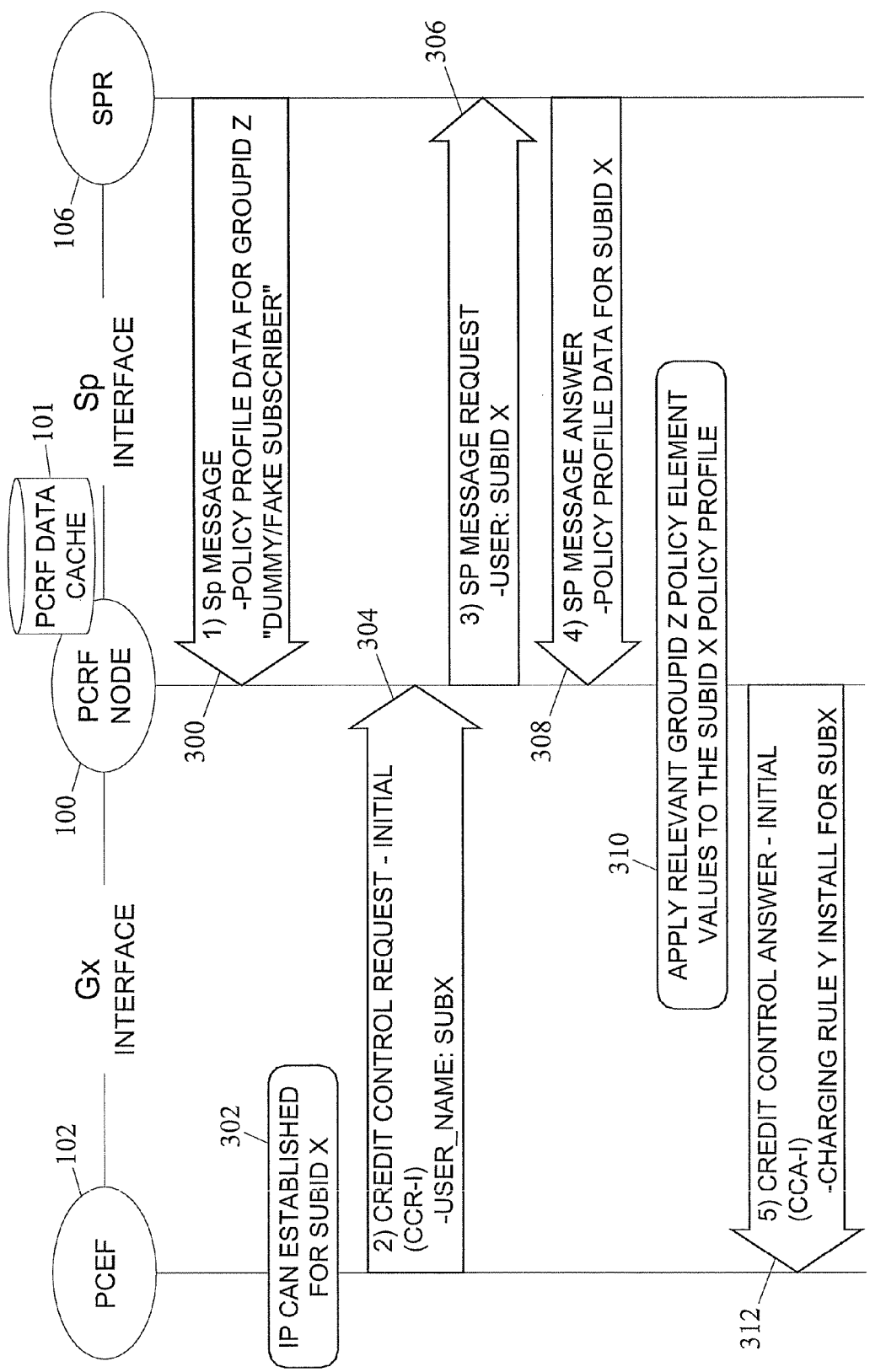
FIGS. 3A and 3B are message sequence diagram illustrating an exemplary process for providing nested policy configuration in a communications network according to an embodiment of the subject matter described herein.

FIG. 3A is a message sequence diagram illustrating an exemplary process for providing nested policy configuration in a communications network according to an embodiment of the subject matter described herein. Referring to FIG. 3A, at step 300, SPR 106 may send a SP message to PCRF 100 that includes policy profile data for a dummy/fake subscriber (e.g., GroupID Z).

At step 302, PCEF 102 may establish a session for subscriber ID X through an IP Connectivity Access Network (e.g. WLAN). IP-CAN is a collection of network entities and interfaces that provides IP transport connectivity between UEs and core network entities. In one exemplary IP-CAN session establishment scenario, PCEF 102 may receive an IP-CAN session creation request. The IP-CAN session creation request may be a GTP message, or a trigger message unrelated to the 3G network. As further description of conventional IP-CAN session establishment is not necessary to understand the subject matter described herein, details will be omitted for clarity.

At step 304, PCEF 102 may send a credit control request initial (CCR-I) message for subscriber ID X to PCRF 100 and is used between a Diameter credit-control client and a credit-control server to request credit authorization for a given service.

At step 306, PCRF 100 may send a subscriber profile (SP) Message Request for subscriber ID X to SPR 106 for obtaining policy profile data for subscriber ID X.

At step 308, SPR 106 may respond to the SP Message Request by returning an SP Message Answer that includes policy profile data for subscriber ID X.

At step 310, PCRF 100 may apply relevant group ID Z policy element values to the subscriber ID X policy profile. PCRF 100 may perform a lookup in PCRF data cache 101 and determine that charging rule Y should be applied to subscriber ID X.

At step 312, PCRF 100 may send a credit control answer (CCA) message corresponding to the CCR sent in step 304. The CCA message may include a charging rule Y Install for subscriber ID X.

Figure 3B:
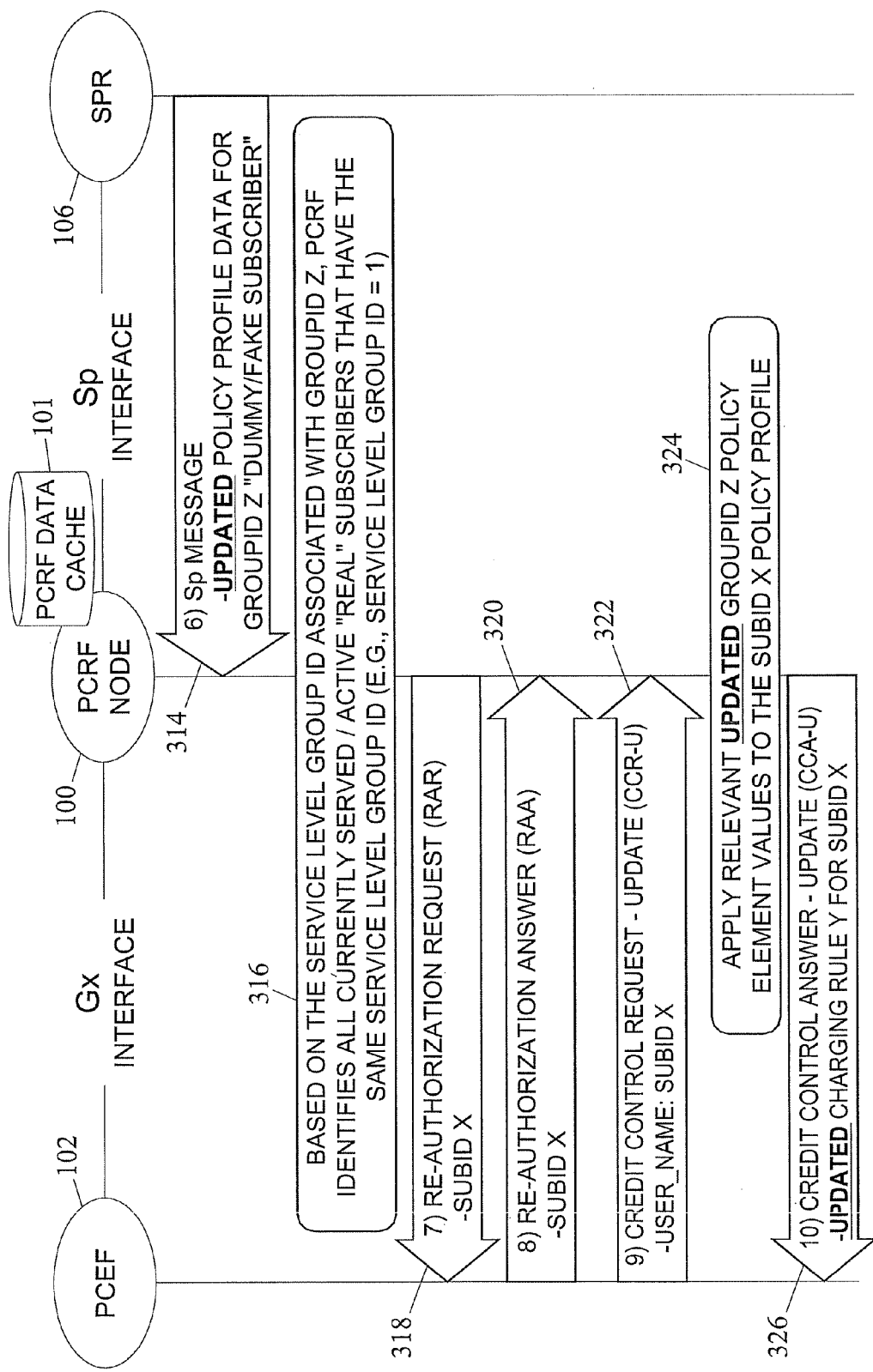

FIG. 3B is a message sequence diagram that continues the exemplary process for providing nested policy configuration in a communications network according to an embodiment of the subject matter described herein illustrated in FIG. 3A. Referring to FIG. 3B, the policy profile information obtained and applied in FIG. 3A may be updated and the updated policy information may be provided to PCEF 102. For example, at step 314, SPR 106 may send an SP message to PCRF 100 that includes updated policy profile data for the dummy/fake subscriber (e.g., Group ID Z). The SP message may either be pushed to PCRF 100 at bootup (i.e., initialization time) or pushed (i.e., unsolicited) anytime.

At step 316, PCRF 100 may identify all currently served/active "real" subscribers that have the same service level group ID as the fake subscriber (e.g., Group ID Z). For example, Group ID Z may be associated with Service Level Group ID 1.

At step 318, PCRF 100 may send a re-authorization request (RAR) message for subscriber ID X.

At step 320, PCEF 102 may return a re-authorization answer (RAA) message in response to the RAR sent in step 318 for subscriber ID X.

At step 322, PCEF 102 may send a credit control request for subscriber ID X that updates CCR-U.

At step 324, PCRF 100 may apply relevant updated policy element values associated with group ID Z to the profile of subscriber ID X.

At step 326, PCRF 100 may return a credit control answer message to PCEF 102 in response to the credit control request sent in step 322. The credit control answer may update CCA-U and include updates charging rule Y for subscriber ID X.

Figure 4:
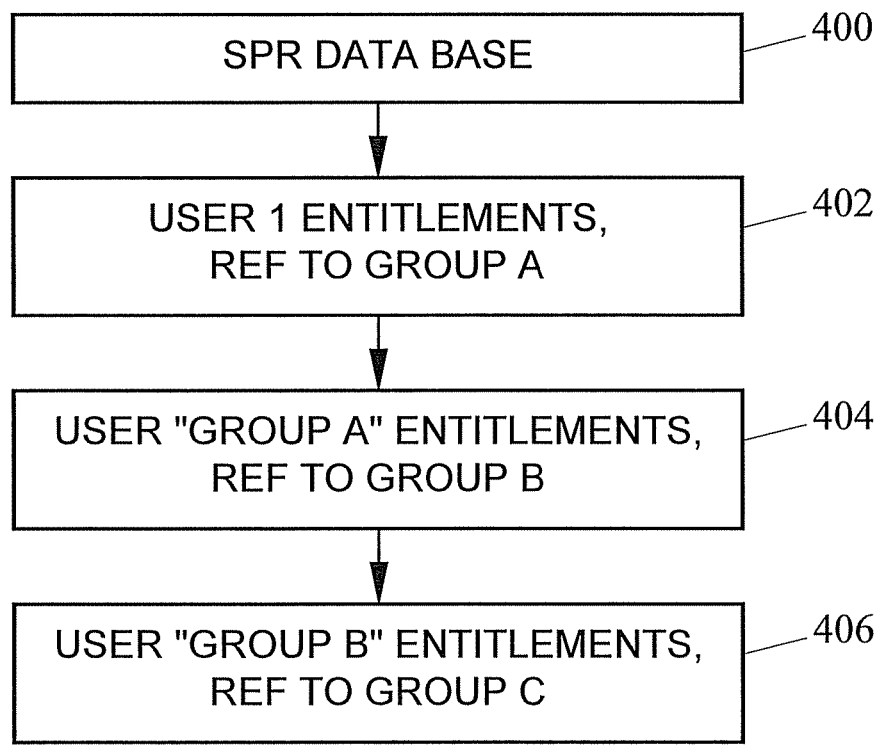
FIG. 4 is a block diagram of a nested policy database record according to an embodiment of the subject matter described herein.

The process illustrated in FIG. 2 of obtaining policy information for user may be repeating iteratively until a leaf node of a policy tree is reached. For example, FIG. 4 illustrates a nested policy record that may be obtained by an SPR according to an embodiment of the subject matter described herein. Referring to FIG. 4, SPR database 400 includes a first record 402 that may be indexed by the identifier for user 1 and which also contains a pointer or other identifier for Group A. SPR database 400 includes a second record 404 that is referenced by the identifier Group A and that contains another nested identifier that identifies Group B. SPR database 400 may include another record 406 that contains another identifier referencing another group, Group C. Nested records, such as those illustrated in FIG. 4, can be implemented using any number of levels of nesting so that different users can have customized policies depending on the memberships or other affiliations of the users. For example, PCRF 100 may dip the SPR multiple times so that it may retrieve a chain of user profiles. The first profile may be the profile of an individual user. The first profile may know the downloaded via PCRF 100 to a policy enforcement node. The first profile may reference Group A. The profile of user Group A will then be obtained by PCRF 100 and provided to the policy enforcement node. The policy record for Group A in turn may reference the profile of a larger group, Group B. PCRF 100 may use the identifier for Group B extracted from the policy record for Group A to obtain a policy record for Group B. The profile of user Group B will then get downloaded to the PCEF. This iterative process may repeat itself until the leaf of a profile tree is reached, where a leaf is simply a record that does not refer to another record.

Below is an example of a simple SPR user record:

```
<AccountId>274500345197</AccountId>
<Entitlement>Music</Entitlement>
<Tier>Gold</Tier>
<BillingDay>23</BillingDay>
<EquipmentId  Type="MEID"
DeviceType="Data Card">A10000009296F2</EquipmentId>
<individual-quota>5GB></individual-quota>
<Refer-To> AccountId="The- Rajagopalans" </Refer-to>
```

In the user record, the <Refer-To> AccountId field refers to "The-Rajagopalans." The identifier "The-Rajagopalans" is a nested identifier in a user record that may be used to obtain subsequent records. The following is a record that may contain additional entitlements for user=274500345197, as he is part of the Rajagopalan family:

```
<AccountId>The-Rajagopalans</AccountId>
<family-quota-pool>5GB></ family-quota-pool>
```

PCRF 100, upon a user attached request received from the enforcement node, may implement the following algorithm to provide nested user policies according to an embodiment of the subject matter described herein:

1. Dip the SPR using the sub-ID as a key;
2. Derive rule(s) based on the user entitlements/attributes; Add the Rule(s) to previous rule(s) if such exist;
3. If the downloaded user record includes a reference to next SPR record (Refer-To attribute) then
    3.1 sub-ID:=content to Refer-To;
    3.2. Goto step 1;
4. Install the rule(s), which was (were) generated in the steps above into the enforcement;

Thus, using nested policy information as described herein, different subsets of policy rules can be implemented for different users, depending on the affiliations or associations of the users. Such a configuration also allows the simultaneous updating of policies for plural users without having to update each individual user record. For example, an update for a policy that resides at an intermediate node in a policy tree shared by plural users may be made at the intermediate node. By the making the update at the intermediate node of the policy tree, the next time policy is downloaded for each of the users, the updated policies will automatically be applied.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing nested policy configuration in a communications network, the method comprising:
    at a policy and charging rules function (PCRF) node:
        obtaining, from a policy profile database, a first policy record associated with a first identifier, wherein the first identifier is associated with a first subscriber and wherein the first policy record includes a second identifier nested within the first policy record, wherein obtaining the first policy record includes performing a first query to the policy profile database using the first identifier;
        obtaining, using the second identifier obtained from the first policy record and from the policy profile database, a second policy record associated with the second identifier, wherein the second identifier is different from the first identifier, wherein obtaining the second policy record includes performing a second query using the second identifier, wherein the second query is separate from the first query, and wherein the second policy record is separate from the first policy record; and
        applying a combined policy to the first subscriber, wherein the combined policy includes policy elements from the first and second policy records.

2. The method of claim 1 wherein obtaining the first policy record includes obtaining the first policy record from one of a subscription profile repository (SPR), a home subscriber server (HSS), and a authentication authorization and accounting (AAA) server.

3. The method of claim 1 wherein obtaining the second policy record includes obtaining the second policy record from one of a subscription profile repository (SPR), a home subscriber server (HSS), a authentication authorization and accounting (AAA) server, a group policy server, and a group policy provisioning system.

4. The method of claim 1 wherein applying the combined policy to the first subscriber includes pushing the combined policy to a policy and charging enforcement function (PCEF) that serves the first subscriber.

5. The method of claim 1 wherein applying the combined policy to the first subscriber includes pulling, by a policy and charging enforcement function (PCEF) that serves the first subscriber, the combined policy from the PCRF, wherein pulling the combined policy includes querying the PCRF for the combined policy.

6. The method of claim 1 wherein the second identifier comprises a fake user identifier known by the policy profile database to be associated with the second policy record.

7. The method of claim 1 wherein the policy profile database pushes the second policy record to plural PCRF nodes and where the plural PCRF nodes override individual policies with policies in the second policy record.

8. The method of claim 1 wherein the second policy record includes a third identifier and wherein the method further comprises obtaining, from the policy profile database, a third policy record associated with the third identifier.

9. The method of claim 8 comprising iteratively obtaining policy records from the policy profile database using identifiers in the policy records received from the policy profile database until a leaf of a policy profile tree is reached and installing policy rules obtained in each iteration in an enforcement node.

10. The method of claim 9 comprising updating a policy profile at an intermediate node in the policy tree and automatically applying the updated policy to users whose policy profiles correspond to nodes that depend from the intermediate node.

11. A system for providing nested policy configuration in a communications network, the system comprising:
    a policy profile database for storing a first policy record associated with a first identifier, wherein the first identifier is associated with a first subscriber and wherein the first policy record includes a second identifier nested within the first policy record, the policy profile database including a second policy record associated with the second identifier; and
    a policy and charging rules function (PCRF) node comprising a computing platform having at least one processor and at least one network interface for obtaining the first policy record from the policy profile database using the first identifier, for obtaining the second policy record from the policy profile database using the second identifier obtained with the first policy profile information, and for applying a combined policy to the first subscriber, wherein the policy includes policy elements from the first and second policy records, wherein obtaining the first policy record includes performing a first query to the policy profile database using the first identifier, wherein the second identifier is different from the first identifier, wherein obtaining the second policy record includes performing a second query using the second identifier, wherein the second query is separate from the first query, and wherein the second policy record is separate from the first policy record.

12. The system of claim 11 wherein the policy profile database comprises one of a subscription profile repository (SPR), a home subscriber server (HSS), and a authentication authorization and accounting (AAA) server, a group policy server, and a group policy provisioning system.

13. The system of claim 11 wherein the PCRF is configured to push the combined policy to a policy and charging enforcement function (PCEF) that serves the first subscriber.

14. The system of claim 11 wherein the PCRF is configured to provide the combined policy from the policy profile database in response to receiving a request for the combined policy from a policy and charging enforcement function (PCEF) that serves the first subscriber.

15. The system of claim 11 wherein the second identifier comprises a fake user identifier known by the policy profile database to be associated with the second policy record.

16. The system of claim 11 wherein the policy profile database pushes the second policy record to plural PCRF nodes and where the plural PCRF nodes override individual policies with the group policy.

17. The system of claim 11 wherein the second policy record includes a third identifier and wherein the PCRF node is configured to, from the policy profile database, a third policy record associated with the third identifier.

18. The system of claim 11 wherein the PCRF node is configured to iteratively obtain policy record from the policy profile database using identifiers in the policy record received from the policy profile database until the leaf of a policy profile tree is reached and to install policy rules in an enforcement node obtained during each iteration.

19. The system of claim 18 wherein the PCRF is configured to iteratively obtain policy records from the policy profile database using identifiers in the policy records received from the policy profile database until the leaf of a policy profile tree is reached and to install policy rules in an enforcement node obtained during each iteration.

20. A non-transitory, tangible computer readable medium comprising computer executable instructions embodied in a non-transitory computer readable medium and when executed by a processor of a computer performs steps comprising:
    at a policy and charging rules function (PCRF) node:
        obtaining, from a policy profile database, a first policy record associated with a first identifier, wherein the first identifier is associated with a first subscriber and wherein the first policy record includes a second identifier nested within the first policy record, wherein obtaining the first policy record includes performing a first query to the policy profile database using the first identifier;
        obtaining, using the second identifier obtained from the first policy record and from the policy profile database, a second policy record associated with the second identifier, wherein the second identifier is different from the first identifier, wherein obtaining the second policy record includes performing a second query using the second identifier, wherein the second query is separate from the first query, and wherein the second policy record is separate from the first policy record; and
        applying a combined policy to the first subscriber, wherein the combined policy includes policy elements from the first and second policy records.

* * * * *